United States Patent
Morrison et al.

(10) Patent No.: US 10,041,800 B2
(45) Date of Patent: Aug. 7, 2018

(54) PEDESTRIAN SENSOR ASSISTANCE IN A MOBILE DEVICE DURING TYPICAL DEVICE MOTIONS

(71) Applicant: QUALCOMM Incorporated, San Diego, CA (US)

(72) Inventors: William Morrison, San Francisco, CA (US); Ming Sun, Sunnyvale, CA (US); Ning Luo, Cupertino, CA (US); Joseph Czompo, San Jose, CA (US); Benjamin Werner, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 15/275,006

(22) Filed: Sep. 23, 2016

(65) Prior Publication Data

US 2018/0087904 A1    Mar. 29, 2018

(51) Int. Cl.
*G01C 21/16* (2006.01)
*G01C 22/00* (2006.01)
*G01C 25/00* (2006.01)

(52) U.S. Cl.
CPC .......... *G01C 21/16* (2013.01); *G01C 21/165* (2013.01); *G01C 22/006* (2013.01); *G01C 25/005* (2013.01)

(58) Field of Classification Search
CPC .... G01C 21/16; G01C 21/165; G01C 25/005; G01C 22/006
USPC ........................................................ 701/534
See application file for complete search history.

(56) References Cited

U.S. PATENT DOCUMENTS

| | | | |
|---|---|---|---|
| 4,637,402 | A | 1/1987 | Adelman |
| 5,617,317 | A | 4/1997 | Ignagni |
| 6,813,582 | B2 | 11/2004 | Levi et al. |
| 7,299,034 | B2 | 11/2007 | Kates |
| 7,487,670 | B2 | 2/2009 | Fink et al. |
| 8,578,773 | B1 | 11/2013 | Feng et al. |
| 2002/0021245 | A1 | 2/2002 | Lin et al. |

(Continued)

FOREIGN PATENT DOCUMENTS

| | | |
|---|---|---|
| EP | 1994883 A1 | 11/2008 |
| EP | 2871446 A2 | 5/2015 |

(Continued)

OTHER PUBLICATIONS

Hoseinitabatabaei S.A., et al., "uDirect: A novel approach for pervasive observation of user direction with mobile phones", Pervasive Computing and Communications (PERCOM), 201 1 IEEE International Conference on, IEEE, Mar. 21, 2011 (Mar. 21, 2011), pp. 74-83, XP031868417.

(Continued)

*Primary Examiner* — Brian P Sweeney
(74) *Attorney, Agent, or Firm* — Kilpatrick Townsend & Stockton, LLP (57) ABSTRACT

Techniques provided herein are directed toward resolving a direction of travel of a mobile device based on MEMS sensor data by identifying a type of motion the mobile device is subject to and offsetting vertical acceleration data with horizontal acceleration data by a predetermined time offset based on the identified type of motion. The offset vertical and horizontal acceleration data can then be used to resolve, with an increased accuracy, a direction of travel of the mobile device.

24 Claims, 7 Drawing Sheets

(56) References Cited

U.S. PATENT DOCUMENTS

| | | |
|---|---|---|
| 2002/0158805 A1 | 10/2002 | Turnbull et al. |
| 2002/0165910 A1 | 11/2002 | Brown et al. |
| 2003/0018430 A1 | 1/2003 | Ladetto et al. |
| 2003/0191582 A1 | 10/2003 | Terada |
| 2004/0147244 A1 | 7/2004 | Raisanen |
| 2005/0033200 A1 | 2/2005 | Soehren et al. |
| 2008/0201033 A1 | 8/2008 | Demersseman et al. |
| 2008/0255800 A1 | 10/2008 | Meriheina et al. |
| 2008/0281555 A1 | 11/2008 | Godin et al. |
| 2009/0054077 A1 | 2/2009 | Gauthier et al. |
| 2009/0239586 A1 | 9/2009 | Boeve et al. |
| 2009/0292495 A1 | 11/2009 | Navarro, Jr. et al. |
| 2010/0045667 A1 | 2/2010 | Kornmann et al. |
| 2010/0130125 A1 | 5/2010 | Nurmi |
| 2010/0130229 A1 | 5/2010 | Sridhara et al. |
| 2010/0273461 A1 | 10/2010 | Choi |
| 2011/0125404 A1 | 5/2011 | Czompo |
| 2012/0086438 A1 | 4/2012 | Tu |
| 2012/0136573 A1* | 5/2012 | Janardhanan ........ G01C 21/165 701/512 |
| 2012/0296603 A1 | 11/2012 | Kulik et al. |
| 2013/0040653 A1 | 2/2013 | Czompo et al. |
| 2013/0046505 A1 | 2/2013 | Brunner et al. |
| 2013/0090881 A1 | 4/2013 | Janardhanan et al. |
| 2015/0316576 A1 | 11/2015 | Pakzad et al. |
| 2015/0316578 A1 | 11/2015 | Pakzad et al. |
| 2015/0316579 A1 | 11/2015 | Pakzad et al. |
| 2016/0003622 A1* | 1/2016 | Janardhanan ......... G01C 21/12 701/400 |

FOREIGN PATENT DOCUMENTS

| | | | |
|---|---|---|---|
| FR | 2914739 | A1 | 10/2008 |
| FR | 2937423 | A1 | 4/2010 |
| JP | 2005114537 | A | 4/2005 |
| JP | 2006175206 | A | 7/2006 |
| WO | 2014110672 | A1 | 7/2014 |
| WO | 2015126678 | A1 | 8/2015 |

OTHER PUBLICATIONS

Kunze, et al., "Which way am I facing: Inferring horizontal device orientation from an accelerometer signal," 2009 International Symposium on Wearable Computers, ISWC '09, pp. 149-150.

Kunze, K., et al., "Where am I: Recognizing On-body Positions of Wearable Sensors", Lecture Notes in Computer Science vol. 3479, Jan. 1, 2005 (Jan. 1, 2005), XP55041023, LoCA 2005 DOI: 10.1007/1 1426646-25 ISBN : 978-3-54-025896-4, pp. 264-275.

Kupper, et al., "TraX: A Device-Centric Middleware Framework for Location-Based Services," IEEE Communications Magazine, vol. 44, No. 9, pp. 114-120.

Kurata T., et al., "Personal positioning based on walking locomotion analysis with self-contained sensors and a wearable camera", Proceedings of the Second IEEE and ACM International Symposium on Mixed and Augmented Reality, Oct. 7, 2003 (Oct. 7, 2003), Oct. 10, 2003 (Oct. 10, 2003), pp. 103-112.

Murray-Smith, et al., "Gait alignment in mobile phone conversations", MobileHCI '07 Proceedings of the 9th international conference on Human computer interaction with mobile devices and services, 2007, 8 pages.

Steinhoff U., et al., "Dead reckoning from the pocket—An experimental study", Pervasive Computing and Communications (PERCOM), 2010 IEEE International Conference on, IEEE, Piscataway, NJ, USA, Mar. 29, 2010 (Mar. 29, 2010), pp. 162-170, XP031677610.

International Search Report and Written Opinion—PCT/US2017/050490—ISA/EPO—Dec. 1, 2017.

* cited by examiner

PEDESTRIAN SENSOR ASSISTANCE IN A MOBILE DEVICE DURING TYPICAL DEVICE MOTIONS

BACKGROUND

A mobile device (such as a cellular telephone, a smart phone, a tablet computer, a laptop computer, a wearable computer, a navigation and/or tracking device, etc.) may be enabled to determine its location through the use of location determination technology including global navigation satellite system (GNSS), trilateration using fixed base stations or access points, and/or the like. Location determination technology may additionally or alternatively include using sensors on the mobile device for dead reckoning. Micro-Electro-Mechanical Systems (MEMS)-based and non-MEMS-based sensors can include accelerometers, gyroscopes, magnetometers, and/or other MEMS-based sensors.

Problematically, however, MEMS-based dead reckoning is prone to inaccuracies due to uncertainties regarding the overall direction in which the mobile device is moving. For example, a mobile device may be subject to swinging and/or other movements that can confuse algorithms that determine the direction of travel for dead reckoning, resulting in these inaccuracies.

SUMMARY

Techniques provided herein are directed toward resolving a direction of travel of a mobile device based on MEMS sensor data by identifying a type of motion the mobile device is subject to and offsetting vertical acceleration data with horizontal acceleration data by a predetermined time offset based on the identified type of motion. The offset vertical and horizontal acceleration data can then be used to resolve, with an increased accuracy, a direction of travel of the mobile device.

An example mobile device, according to the description, comprises one or more micro electromechanical system (MEMS)-based sensors configured to provide MEMS sensor data indicative of motion of a user, the MEMS sensor data including vertical acceleration data and horizontal acceleration data, and a processing unit communicatively coupled with the one or more MEMS-based sensors and configured to. The processing unit is configured to obtain the MEMS sensor data from the one or more MEMS-based sensors and determine, using the MEMS sensor data an estimated direction of travel, and a type of motion. The processing unit is further configured to offset the vertical acceleration data from the horizontal acceleration data by a predetermined time offset corresponding to the determined type of motion, and use the offset vertical and horizontal acceleration data to determine a corrected direction for the estimated direction of travel.

The mobile device may include one or more of the following features. The processing unit may be further configured to determine a boosted vector based on the offset of the vertical acceleration data from the horizontal acceleration data. The processing unit may be configured to use the offset vertical and horizontal acceleration data to determine the corrected direction of the estimated direction of travel by performing a dot product of the boosted vector and a vector representing the estimated direction of travel. The processing unit may be further configured to transform the MEMS sensor data such that the vector representing the estimated direction of travel and the boosted vector are in a horizontal plane defined relative to the earth's surface. The processing unit may be configured to determine the boosted vector by determining horizontal scalars, where each horizontal scalar is a sum of a multiplication of a vertical component of a vector representing the estimated direction of travel and a corresponding horizontal component of the vector representing the estimated direction of travel. The processing unit may be configured to determine the type of motion by selecting, based on the MEMS sensor data, the determined type of motion from a plurality of types of motion.

An example method of providing pedestrian sensor assistance in a mobile device, according to the description, comprises obtaining microelectromechanical system (MEMS) sensor data from one or more MEMS-based sensors, the MEMS sensor data including vertical acceleration data and horizontal acceleration data, and determining, using the MEMS sensor data an estimated direction of travel, and a type of motion. The method further comprises offsetting the vertical acceleration data from the horizontal acceleration data by a predetermined time offset corresponding to the determined type of motion, and using the offset vertical and horizontal acceleration data to determine a corrected direction for the estimated direction of travel.

The method may further comprise one or more of the following features. The method may further comprise determining a boosted vector based on the offset of the vertical acceleration data from the horizontal acceleration data. The method may further comprise using the offset vertical and horizontal acceleration data to determine the corrected direction of the estimated direction of travel by performing a dot product of the boosted vector and a vector representing the estimated direction of travel. The method may further comprise transforming the MEMS sensor data such that the vector representing the estimated direction of travel and the boosted vector are in a horizontal plane defined relative to the earth's surface. The method may further comprise determining the boosted vector by determining horizontal scalars, where each horizontal scalar is a sum of a multiplication of a vertical component of a vector representing the estimated direction of travel and a corresponding horizontal component of the vector representing the estimated direction of travel. The method may further comprise determining the type of motion by selecting, based on the MEMS sensor data, the determined type of motion from a plurality of types of motion.

An example apparatus, according to the description, comprises means for obtaining motion data including vertical acceleration data and horizontal acceleration data, means for determining, using the motion data an estimated direction of travel, and a type of motion. The apparatus further comprises means for offsetting the vertical acceleration data from the horizontal acceleration data by a predetermined time offset corresponding to the determined type of motion, and means for using the offset vertical and horizontal acceleration data to determine a corrected direction for the estimated direction of travel.

The apparatus may further comprise one or more of the following features. The apparatus may further comprise means for determining a boosted vector based on the offset of the vertical acceleration data from the horizontal acceleration data. The apparatus may further comprise means for using the offset vertical and horizontal acceleration data to determine the corrected direction of the estimated direction of travel by performing a dot product of the boosted vector and a vector representing the estimated direction of travel. The apparatus may further comprise means for transforming the motion data such that the vector representing the estimated direction of travel and the boosted vector are in a horizontal plane defined relative to the earth's surface. The apparatus may further comprise means for determining the boosted vector by determining horizontal scalars, where each horizontal scalar is a sum of a multiplication of a vertical component of a vector representing the estimated direction of travel and a corresponding horizontal component of the vector representing the estimated direction of travel. The apparatus may further comprise means for determining the type of motion by selecting, based on the motion data, the determined type of motion from a plurality of types of motion.

An example non-transitory computer-readable medium, according to the description, has instructions embedded thereon for providing pedestrian sensor assistance in a mobile device. The instructions include computer code for obtaining microelectromechanical system (MEMS) sensor data from one or more MEMS-based sensors, the MEMS sensor data including vertical acceleration data and horizontal acceleration data, determining, using the MEMS sensor data an estimated direction of travel, and a type of motion. The instructions further include computer code for offsetting the vertical acceleration data from the horizontal acceleration data by a predetermined time offset corresponding to the determined type of motion, and using the offset vertical and horizontal acceleration data to determine a corrected direction for the estimated direction of travel.

The non-transitory computer-readable medium can include one or more of the following features. The instructions may further comprise computer code for determining a boosted vector based on the offset of the vertical acceleration data from the horizontal acceleration data. The instructions may further comprise computer code for using the offset vertical and horizontal acceleration data to determine the corrected direction of the estimated direction of travel by performing a dot product of the boosted vector and a vector representing the estimated direction of travel. The instructions may further comprise computer code for transforming the MEMS sensor data such that the vector representing the estimated direction of travel and the boosted vector are in a horizontal plane defined relative to the earth's surface. The instructions may further comprise computer code for determining the boosted vector by determining horizontal scalars, where each horizontal scalar is a sum of a multiplication of a vertical component of a vector representing the estimated direction of travel and a corresponding horizontal component of the vector representing the estimated direction of travel. The instructions may further comprise computer code for determining the type of motion by selecting, based on the MEMS sensor data, the determined type of motion from a plurality of types of motion.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various example techniques are provided herein which may be implemented at a mobile device to support positioning capabilities, at least in part, by enabling the mobile device to more accurately determine the direction of travel for dead reckoning.

It will be understood that, although embodiments described the utilization of Micro-Electro-Mechanical Systems (MEMS)-based sensors, the techniques described herein can be employed where additional and/or alternative types of sensors are used.

Dead reckoning can be utilized by mobile device to determine a location of the mobile device based on MEMS sensor data from MEMS sensors integrated into the mobile device itself. Problematically, however, it can be difficult to obtain an accurate location estimate from dead reckoning because of the wide variety of movements that the mobile device may undergo (as sensed by the MEMS sensors). For example, motion sensed by MEMS sensors of a mobile device while a user is walking (or jogging, running, etc.) can include a wide array of movements that are not necessarily in the overall direction of travel. Because of this, algorithms for determining the overall direction of travel may confuse the overall direction in which travel is occurring. Oftentimes, these algorithms estimate a direction of travel that is off by 180° (opposite from the actual direction of travel).

Techniques are provided herein to solve this and other problems, increasing the accuracy of location estimates based on dead reckoning by employing techniques that leverage known offsets in the vertical and horizontal movements to more accurately determine the true direction of travel. Such techniques may be utilized, for example, in embodiments where dead reckoning may be one of several location determining technologies utilized in a positioning system. The true direction of travel, corresponding dead reckoning determination, and/or location determination can be provided to an application executed by the mobile device (e.g., a navigation application, fitness application, etc.) to enable or enhance the application's functionality. Additionally or alternatively, the true direction of travel, corresponding dead reckoning determination, and/or location determination can be provided to a positioning system to enable the positioning to determine an accurate location estimation of the mobile device.

Figure 1:
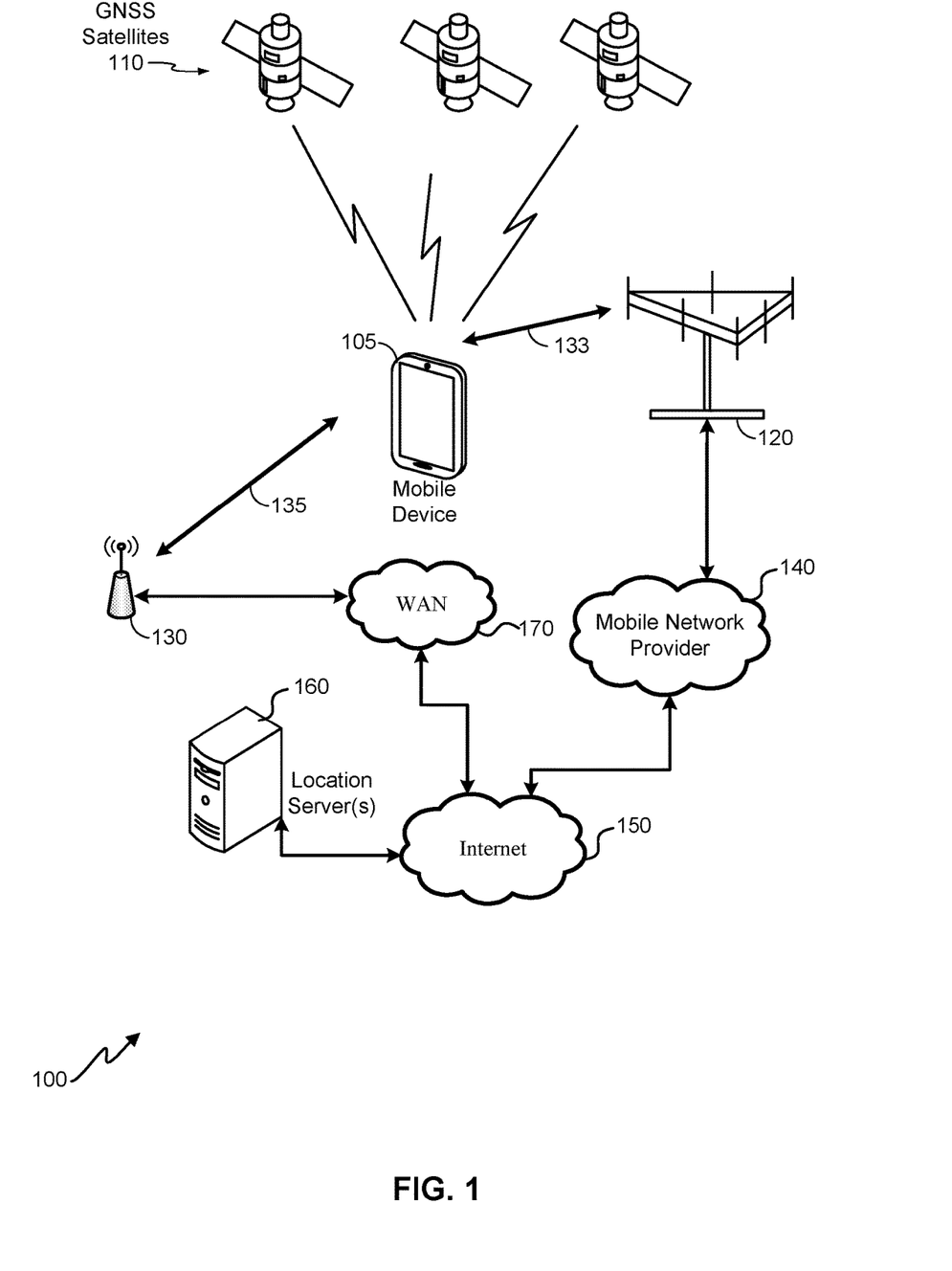
FIG. 1 is a simplified illustration of a positioning system in which a mobile device (and/or other components of the positioning system) can use the techniques provided herein for helping ensure accurate direction of travel determinations in dead reckoning estimations, according to an embodiment.

FIG. 1 is a simplified illustration of a positioning system 100 in which a mobile device 105 and/or other components of the positioning system 100 can use the techniques provided herein for helping ensure accurate direction of travel determinations in dead reckoning estimations, according to an embodiment. The techniques described herein may therefore be implemented by one or more components of the positioning system 100; the mobile device 105 in particular. The positioning system can include a mobile device 105, global navigation satellite system (GNSS) satellite vehicles (SVs) 110, base transceiver station(s) 120, mobile network provider 140, access point(s) (AP(s)) 130, location server(s) 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many antennas 120 and/or APs 130. The illustrated connections that connect the various components in the positioning system 100 comprise data connections which may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The antenna 120 is communicatively coupled to the mobile network provider 140 which may be communicatively coupled with the Internet 150. In some embodiments, the antenna 120 may comprise a base station of a cellular network, which may employ any of a variety of wireless technologies, as described herein below with regard to FIG. 7. The location server(s) 160 can also be communicatively coupled with the Internet 150. Thus, the mobile device 105 can communicate information with the location server(s) 160, for example, by accessing the Internet 150 via the antenna 120 using a first communication link 133. Additionally or alternatively, because an AP 130 and WAN 170 also may be communicatively coupled with the Internet 150, the mobile device 105 may communicate with the location server(s) 160 using a second communication link 135.

Depending on desired functionality, a location of the mobile device 105 can be determined in any of a variety of ways, by the mobile device and/or other devices in communication with the mobile device, which may be situation dependent. In some embodiments, the location server(s) 160 and/or other devices (not shown) remote to the mobile device 105, for example, can be used to implement positioning methods for supporting the positioning of a mobile device 105, typically referred to as a target mobile device, target device, or target. These positioning methods may comprise, for example, measurements by a mobile device of signals transmitted by GNSS SVs 110, antennas 120 belonging to a wireless cellular network (e.g., the mobile network provider 140), a access points (APs) 130, and the like. These positioning methods may also include receiving, from the mobile device 105, MEMS sensor data and/or an estimated position based on dead reckoning, which can be provided to the location server(s) 160 to determine a location and/or complement other techniques of determining a location of the mobile device 105. In some embodiments, the mobile device 105 may utilize the dead reckoning techniques described herein to determine its position without sending or receiving any information from other components of the positioning system 100.

As noted earlier, dead reckoning may be performed by the mobile device 105 and/or other components of the positioning system 100. For pedestrian navigation (that is, navigation in which a pedometer is used to determine steps of a pedestrian), dead reckoning can be one of several data points used to determine an accurate location estimate of the mobile device 105. Dead reckoning can utilize three different data sources: (1) an indication of a step (e.g., as provided by a pedometer), (2) a relative turn angle (which may be provided by a gyroscope, for example), and (3) a course over ground (COG), which provides a velocity vector (direction and magnitude of velocity).

The COG for dead reckoning may be determined by using MEMS sensor data from MEMS sensors of the mobile device 105. In some embodiments, for example, nine axes of information may be utilized: three axes for each of an accelerometer, a gyroscope, and a magnetometer. This information may be processed to determine the COG velocity vector.

As previously noted, location estimation based on dead reckoning can be inaccurate due to variations in the movement of the mobile device while the user of the mobile device is walking, running, jogging, etc. In particular, traditional techniques used to determine the COG may frequently determine a COG estimate that is more than 90° off of the actual direction of travel (typically approximately 180° off; i.e., in the opposite direction of the actual direction of travel). However, techniques provided herein enable a mobile device to resolve a direction of travel for a COG estimate that is far less prone to these inaccuracies. Known techniques can be used to determine an estimated line of travel, for example, an angle relative to a reference direction, such as North, along which the COG velocity vector (comprising both a direction and a magnitude) rests. MEMS sensor data can be used to determine a type of motion as described further below. Using the type of motion determined, a time and/or phase offset may be applied to the vertical acceleration data relative to the horizontal acceleration data. Based on the offset vertical and horizontal acceleration data, a direction of travel along the line of travel can be determined.

Figure 2A:
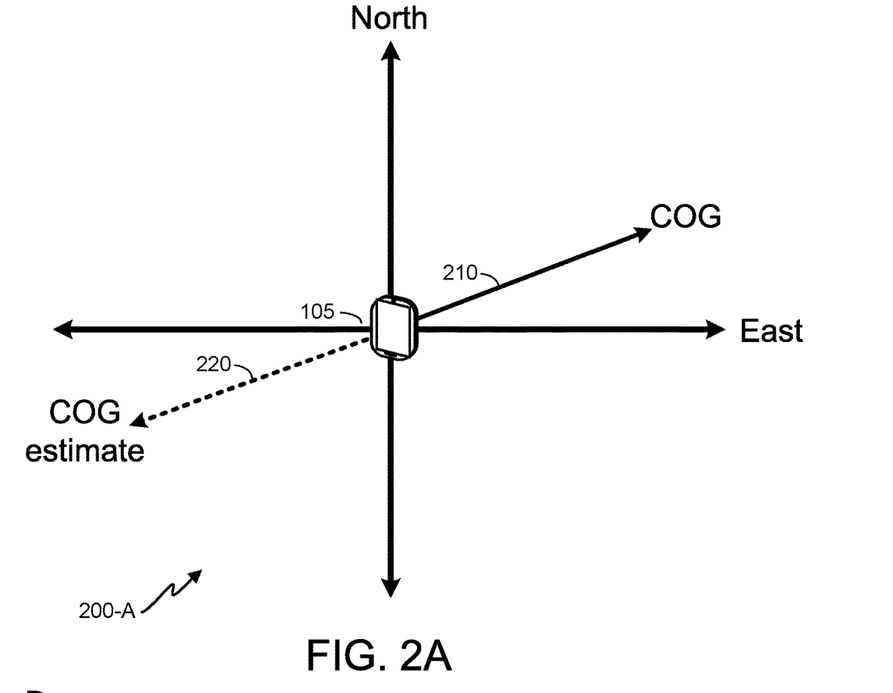
FIGS. 2A and 2B are graphs that help illustrate an example of inaccuracies in course over ground (COG) estimates.
Figure 2B:
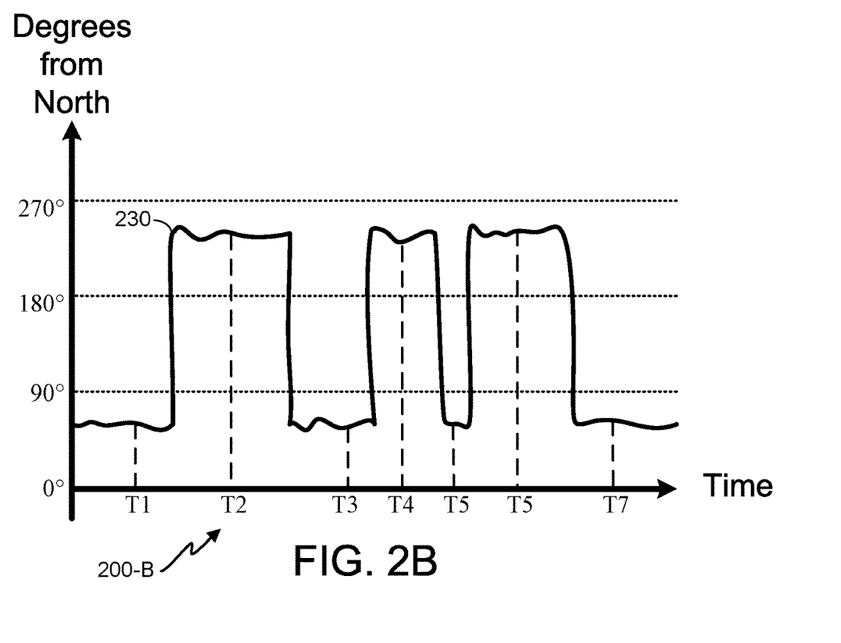

FIGS. 2A and 2B are graphs 200-A and 200-B, respectively, that help illustrate an example of inaccuracies in COG estimates that can be dealt with utilizing the techniques described herein. For dead reckoning determinations, MEMS sensor data obtained from one or more MEMS-based sensors of the mobile device 105 can be translated from a reference frame of the mobile device (e.g., typically in x, y, and z coordinates) to a reference frame of the earth. An "East, North, Up" (ENU) reference frame is such a reference frame. The translation from the mobile device reference frame to the ENU reference frame can include data from non-MEMS-based sensors including, for example, a solid state magnetometer. Hence, reference to MEMS-based sensors should not be understood to exclude the use of data from non-MEMS sensors instead of, or in conjunction with, MEMS-based sensors. As such, data from non-MEMS-based sensors can also be used along with data from MEMS-based sensors to perform the various calculations and determinations disclosed herein. Hence, as discussed above, data from non-MEMS sensors can be used to transform MEMS sensor data and so subsequent computations, calculations, or determinations remain based on the MEMS sensor data even if data from non-MEMS sensors is additionally used.

Here, using the MEMS sensor data (translated to the ENU reference frame) a COG velocity vector 210 can be plotted in the horizontal plane of the ENU reference frame (or "north/east plane"), which is parallel to the earth's surface. Thus, the "north" and "east" axes of the graph 200-A can correspond to north and east directions on the earth's surface. Thus, the COG velocity vector 210 illustrates the speed and direction of the mobile device 105 with respect to the earth's surface.

As previously noted, the mobile device 105 may undergo various movements when a user is jogging, walking with device in pocket, walking with device in hand, etc. These movements can often cause the mobile device 105 to determine a COG estimate 220 that is 180° off (in the opposite direction) of the actual direction of travel (shown by the COG velocity vector 210 in FIG. 2A). Often times, a COG estimate 220 may sporadically oscillate between the actual direction of travel and the opposite direction.

For example, a user may walk in a northeast direction (as depicted by the COG velocity vector 210), swinging the mobile device 105 in his or her hand while walking. Although the course of travel may be continuously in the northeast direction, the mobile device 105 may determine a COG estimate that sporadically oscillates between the northeast direction of travel and a opposite, southwest direction (as illustrated by the COG estimate 220 in FIG. 2A). Hence, while known techniques for determining the COG velocity vector can result in an ambiguity as to whether the correct velocity vector is COG velocity vector 210 or COG estimate 220, these techniques for computing the COG velocity vector 210 can determine the line (the line upon which both vectors 210 and 220 lie) of travel. Furthermore, in other situations, depending upon the method used to compute the COG velocity vector, in some embodiments, the COG velocity vector may defined as between −90 to +90 degrees relative to a given direction, such as East or North. When using such techniques, for example when the COG velocity vector is defined relative to East, the COG will always be in an easterly direction, even if the user is actually moving in a westerly direction. Hence the results of such techniques will always presume a particular direction, even if the direction is actually in an opposite direction. Embodiments disclosed herein enable the determination of a direction for the COG velocity vector 210, whether relative to a line of travel or to an initial COG velocity vector 210 that has an initial direction. As can be understood from FIG. 2A, the line of travel can be expressed as an angle relative to a reference direction, for example, North.

The graph 200-B of FIG. 2B illustrates how this oscillation may occur over time. This graph 200-B plots an estimated direction of travel 230 (corresponding to the COG velocity vector 210 and COG estimate 220 of FIG. 2A) over a period of time. The Y axis of the graph is degrees from north, where 0° is north, 90° is east, 180° is south, and 270° is west. If the direction indicated that time T1 represents an accurate direction of the direction of movement (the northeast direction of the COG velocity vector 210) during the entire period of time, then the estimated direction of travel 230 is accurate at times T1, T3, T5, and T7, but inaccurate at times T2, T4, and T5, when the direction of travel 230 is in the opposite direction (the southwest direction of the COG estimate 220 in FIG. 2A).

Figure 3:
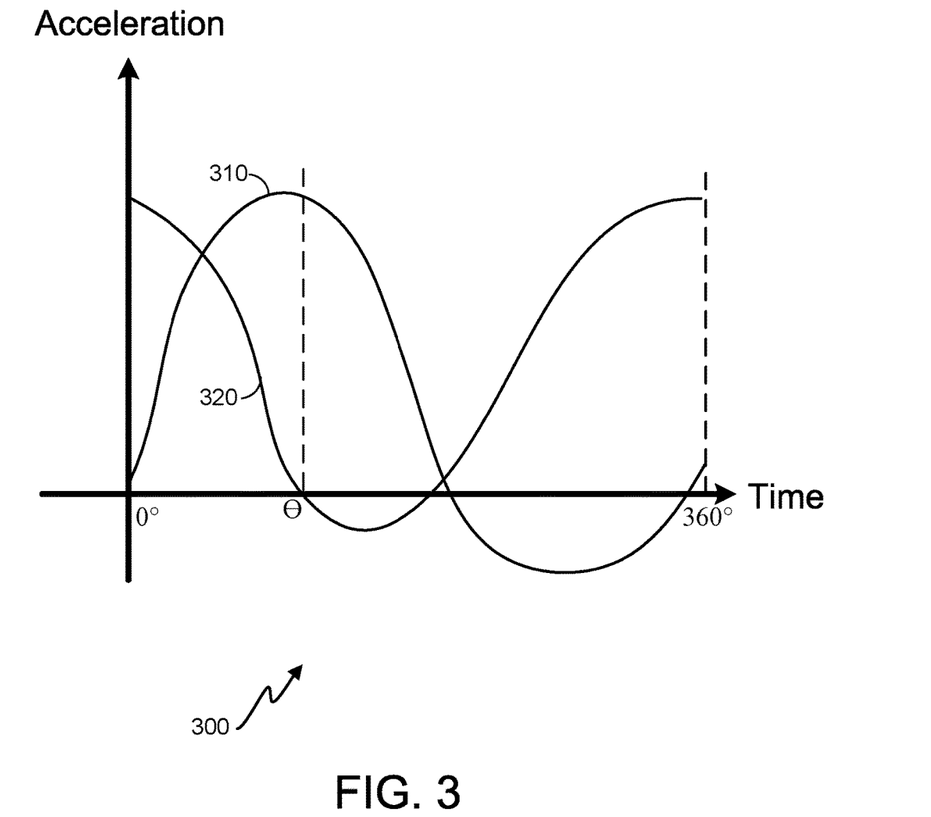
FIG. 3 is a graph of example waveforms collected by the MEMS-based sensors of a mobile device over the course of a stride of a user.

These oscillations in the direction of travel of the COG estimates can result in inaccuracies in a location determination that uses these estimates for dead reckoning. Embodiments of the invention address this by taking advantage of the relationship between vertical and horizontal waveforms generated by MEMS sensors to more accurately resolve the direction of travel of the COG vector. FIG. 3 helps illustrate this relationship.

FIG. 3 is a graph 300 of example waveforms collected by the MEMS-based sensors of a mobile device over the course of a stride of a user. In particular, a vertical acceleration waveform 310 may indicate the amplitude of acceleration in the vertical direction over the course of the user's stride, and horizontal acceleration waveform 320 may indicate the amplitude of acceleration a horizontal direction over the course of the user's stride. A mobile device may transform the underlying MEMS sensor data such that the vertical acceleration waveform 310 and the horizontal acceleration waveform 320 are provided in the ENU reference frame, where the vertical acceleration waveform 310 is along the "up" axis and the horizontal acceleration waveform 320 is along a horizontal axis (e.g., the "east" axis of the north/east horizontal plane, for example). Because the strides of the user results in periodic motion, the vertical acceleration waveform 310 and the horizontal acceleration waveform 320 may comprise an average, mean, or other combined representation of multiple strides of the user taken while the user travels by foot from one location to another.

It should be noted that although only one horizontal waveform 320 is illustrated in FIG. 3 for clarity, there may actually be two horizontal waveforms, e.g., corresponding with both "north" and "east" axes of the horizontal plane in the ENU reference frame. Thus, embodiments described herein as having a "horizontal acceleration waveform" may actually have a plurality of horizontal acceleration waveforms. In such cases, phase shifting between vertical and horizontal waveforms as described herein may comprise a phase shift between a single vertical acceleration waveform and the plurality of horizontal acceleration waveforms or, alternatively, one of the plurality of horizontal waveforms.

A mobile device can determine the periodicity of such movement based on the output waveform itself and/or a pedometer (which may be implemented by the mobile device, e.g., using hardware and/or software to process the MEMS sensor data). For example, periodicity of the wave form may be determined from every other step taken by the user, as detected by the pedometer of the mobile device. The periodic movement can therefore be measured from 0° to 360°, where 0° is the beginning of the periodic movement, and 360° is at the end of the periodic movement. Hence, the data can be transformed from the time domain to a domain where the "phase" of the stride gives a location of a particular data point relative to the step taken by the user.

The horizontal acceleration waveform 320 and the vertical acceleration waveform 310 can be determined using samples taken over the course of the periodic movement. For example, where the periodic movement (from 0° to 360°) occurs over the course of 1 second, and the accelerometers acquiring vertical and horizontal acceleration data are configured to sample the data at a rate of 50 times per second, the horizontal acceleration waveform 320 and the vertical acceleration waveform 310 may be derived from 50 measurements of acceleration taken over the course of the 1 second of the periodic movement. Of course, embodiments may utilize accelerometers (or other MEMS-based sensors) configured to take samples at a higher or lower rate, and the number of samples for each periodic movement can vary based on the speed of the users steps.

The inventors have discovered that by shifting the vertical acceleration waveform 310 with respect to the horizontal acceleration waveform 320 by some phase, θ, the phase-shifted waveforms could then be utilized by a discriminator to more accurately determine the correct direction of travel for a COG estimate. Moreover, different movement types resulted in a different optimal phase shifts, θ, with which the vertical acceleration waveform 310 and horizontal acceleration waveform 320 could be shifted to result in a more accurate determination of the correct direction of travel.

Figure 4:
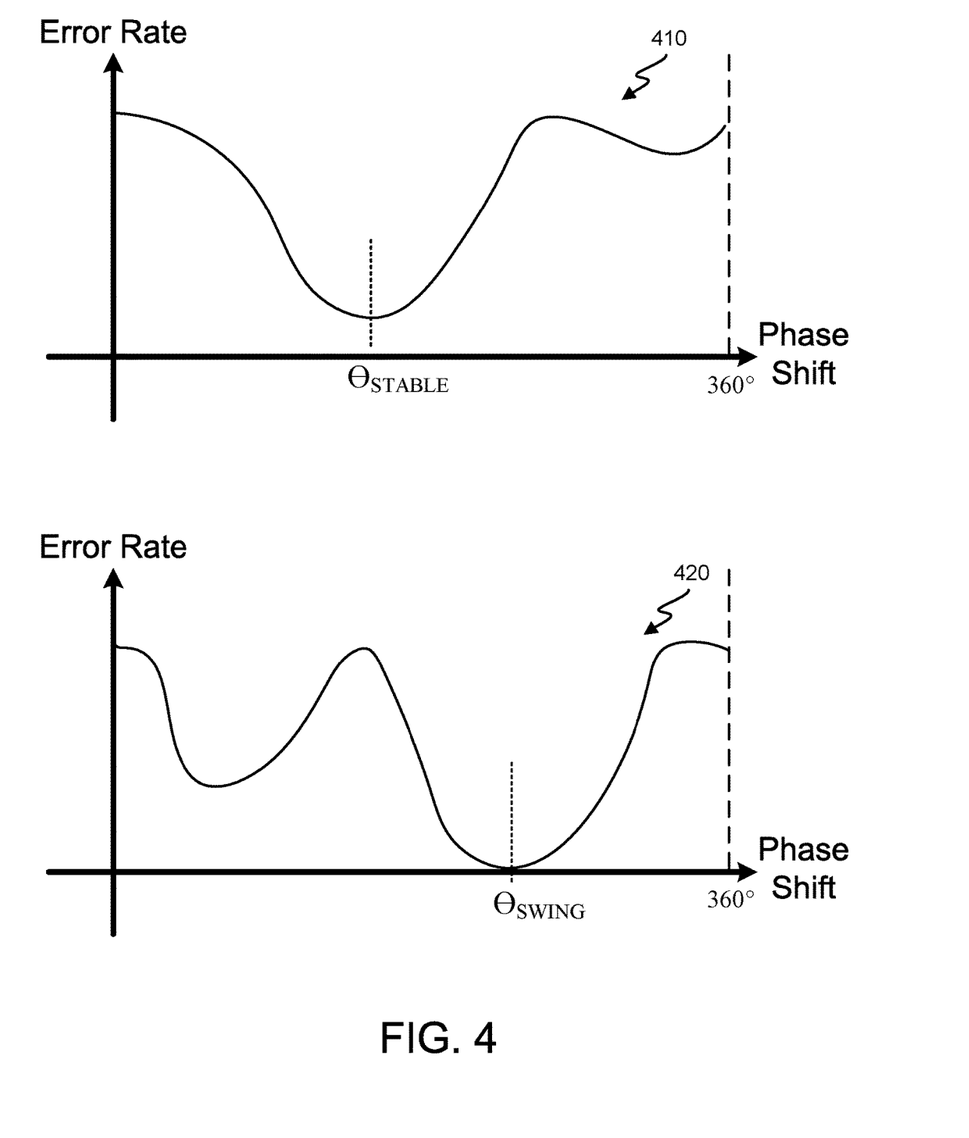
FIG. 4 is an illustration of a set of example graphs that help illustrate how phase shifts for different movement types may be determined.

FIG. 4 is an illustration of a set of example graphs 410 and 420, help illustrate how lowest-error phase shifts (also referred to herein as "time offsets") corresponding to different movement types may be determined. In each graph, an error rate of the direction of travel of an estimated COG for a particular motion is plotted for phase shifts, θ, ranging from 0° to 360°. The first graph 410 represents the error rate for phase shifts between horizontal and vertical waveforms of MEMS sensor data taken while a mobile device is stable relative to a user while the user is walking (e.g., held in a relatively stable position in front of the users face while user is walking). The second graph 420 represents the error rate where the mobile devices in the hand of the user, which is swinging while the user is walking. Phase shifts where the error rate is at a minimum for graphs 410 and 420 are respectively identified as $\theta_{STABLE}$ and $\theta_{SWING}$.

It can be noted that the techniques described herein can be applied to motions of various additional types, other than the "stable" and "swing" motions corresponding to the graphs depicted in FIG. 4. These other motion types can include, for example, walking with the mobile device in the user's front pocket, walking with the mobile device in the user's breast pocket, walking with the mobile device in the user's purse (bag, briefcase, etc.), jogging with the mobile device attached to the user's upper arm, and/or the like.

The determination of the phase shift, θ, with the lowest error rate (e.g., $\theta_{STABLE}$ and $\theta_{SWING}$) can be made by applying phase-shifted horizontal and vertical acceleration waveforms for various phases from θ=0° to 360° (e.g., by using a boosted vector, as described in more detail below with regard to FIG. 5), and comparing the determined direction of travel of the estimated COG with the actual direction of travel. And this determination can be made empirically in the laboratory prior to deployment of the mobile device in the field (e.g., use by an end user or consumer), and is generally not device-dependent. Once the phase shift for various motion types is empirically determined, it has been found to work in many different devices and across many different users. That is, $\theta_{STABLE}$, $\theta_{SWING}$, and/or the lowest-error phase shifts of other types of motion can be predetermined and programmed into or otherwise stored by the mobile device. This allows the mobile device to, in subsequent use, apply the lowest-error phase shift between vertical and horizontal acceleration waveforms corresponding to an identified movement type, thereby enabling the mobile device to provide a more accurate COG estimation for dead reckoning, as explained further below.

The identification of the type of movement made during subsequent use of the mobile device can be done by analyzing the movement of the device over the course of a periodic movement. For example, when a mobile device's pedometer detects a series of steps over a period of time, MEMS sensor data collected during that period of time can be used to create horizontal and vertical acceleration waveforms of the periodic movement made during those steps. These waveforms may be analyzed to identify a type of movement. Different features of the waveforms may be analyzed, depending on desired functionality.

According to some embodiments, for example, different factors may be used to identify a type of periodic movement made by the mobile device. One factor could be an amplitude of the horizontal norm. For example, if the horizontal norm of the horizontal acceleration waveform is less than a threshold value, the movement of the mobile device may be identified as "stable" (i.e., undergoing minimal movement relative to the user as a user travels from one location to another).

According to some embodiments, one factor that could be used to identify a type of periodic movement could be a number of derivative sign changes in the horizontal acceleration waveform. For example, if the number of derivative sign changes in the horizontal acceleration waveform is smaller than a threshold number, then the movement of the mobile device may be identified as "swinging" (i.e., in the hand of the user swinging arm as the user travels from one location to another).

According to some embodiments, a spectrum analysis can be performed on the horizontal and/or vertical acceleration waveform, comparing the energy in one or more frequencies in the movement captured by the mobile device with the energy in one or more frequencies of known movements. Where the energies of similar frequencies substantially match (i.e., within a certain threshold), the type of movement can be determined to be the same.

Ultimately, once a match is found, the phase shift corresponding to the identified motion is used to determine a more accurate direction of travel for the COG estimate. According to some embodiments, the phase-shifted horizontal and vertical acceleration waveforms can be used to create a "boosted" vector that is compared with the COG estimate. This process is described in more detail with respect to FIG. 5.

Figure 5:
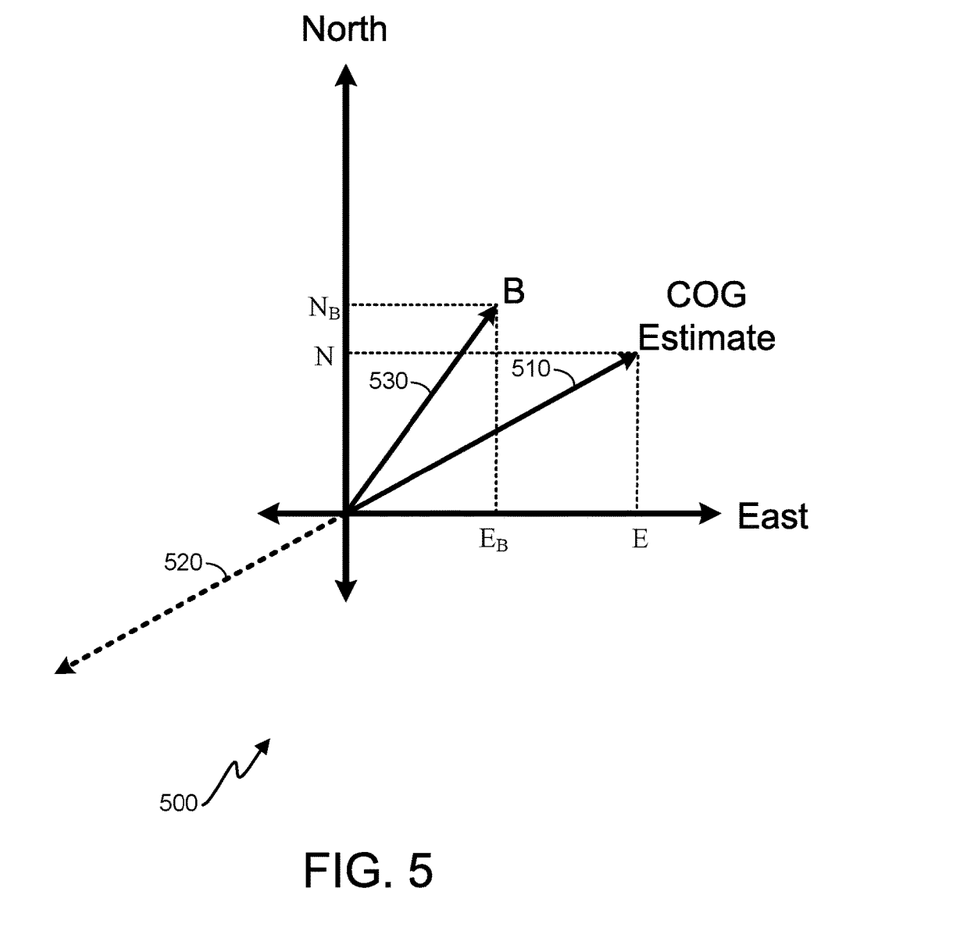
FIG. 5 is an example graph that helps illustrate how phase-shifted horizontal and vertical acceleration waveforms can be used to create a boosted vector, according to one embodiment.

FIG. 5 is a graph 500 that helps illustrate how a boosted vector may be derived from phase-shifted horizontal and vertical acceleration waveforms to more accurately resolve the direction of travel for a COG estimate. Similar to graph 200-A of FIG. 2A, the graph 500 of FIG. 5 shows a north/east (horizontal) plane of the ENU reference frame with a COG estimate 510 plotted on it. As previously noted, the COG estimate 510 may change while a user (in possession of the mobile device) is traveling, sporadically oscillating to a reverse direction of travel 520.

The COG estimate 510 (and 520) comprises of north and east components—N and E, respectively—which are derived from MEMS sensor data at a given point in time and can be computed based on known methods. As discussed above, in some embodiments, a line including COG estimates 510 and 520 is determined, while in other embodiments, the COG estimate 510 is determined relative to a given direction, in the illustrated example, East. Hence, in such an embodiment where the COG estimate 510 is determined relative to the given direction, the COG estimate will always include an initial direction that is assumed to be the direction of travel, in the illustrated example, a northeasterly direction. However, this direction is often incorrect, and the actual COG direction is in the opposite direction, along COG estimate 520.

For COG estimate 510, a boosted vector (B) 530 can be calculated using not only the horizontal acceleration measurements (N and E in the ENU frame) that provide the COG estimate 510 but also a vertical component (U in the ENU frame) captured by the MEMS sensor data that is time-shifted. The boosted vector can determine which direction along the line of travel corresponds to the correct COG direction, or, alternatively, the boosted vector can determine whether the initial direction indicated by the COG estimate 510 (or 520) is correct or whether the COG is actually in the opposite direction. For ease of illustration, the remainder of the discussion will discuss an example where the COG estimate 510 (or 520) indicates an initial direction, for example, where the initial COG estimate is a vector. In some embodiments, north and east components of the boosted vector 530—$N_B$ and $E_B$, respectively—can be calculated as follows:

$$N_B = \Sigma U(i-\theta) \cdot N(i-\theta) \cdot N(i) \quad (1)$$

and $$E_B = \Sigma U(i-\theta) \cdot E(i). \quad (2)$$

Where, N(i) and E(i) are north and east components of corresponding horizontal acceleration waveforms at a given time/phase i, and $U(i-\theta)$ is a value of the vertical (Up) acceleration waveform at the time i, offset by phase shift θ. In some embodiments, time/phase i may correspond to a given sample of MEMS sensor data (or transformed MEMS sensor data) acquired during the course of the user's stride. Hence, it is understood that "shifting" any of U, N, or E is to be understood as circular shifting in the sense that, for example, the last component of the waveform/vector would shift to become the first component in the sifted waveform/vector for a phase shift of one. While the shifting is illustrated relative to the shifting of the vertical component, it is understood that the N or E waveforms may also be shifted instead of U, or both U as well as N and E may be shifted. It is also understood that other methods of determining the boosted vector based on phase-shifted waveforms are also possible.

To ensure increased accuracy of the direction of travel of the COG estimate 510, the dot product of the boosted vector 530 and the COG estimate 510 can then be taken. If the dot product is positive, the COG estimate 510 (illustrated as a vector in FIG. 5) is likely in the right direction and the direction of travel of the COG estimate 510 does not need to be corrected. If the dot product is negative, the COG estimate 510 is likely in the wrong (opposite) direction, and the direction of the COG can then be corrected (to point in the direction of COG estimate 520, for example). In some embodiments, the angle between the boosted vector B and the COG Estimate 510 is related to a confidence in the COG correction. For example, if the boosted vector B is perpendicular or close to perpendicular to COG Estimate 510, then the confidence in the correction of the initial direction is low. However, when the angle between the boosted vector B is beyond a threshold angle from the perpendicular to the COG Estimate 510, the confidence in the COG correction is high. Hence, in some embodiments, no COG correction is made if boosted vector B is closer to a perpendicular to a vector corresponding to the COG Estimate than a threshold.

As previously indicated, the phase shift that produces the fewest amount of errors (when resolving the direction of travel for a COG estimate) can be determined in a training phase by calculating a boosted vector 530 for θ=0° to 360°. Because, during training, the direction of travel is known, the error rate can be determined in plotted, as illustrated in the graphs 410 and 420 of FIG. 4. The phase shift producing the fewest amount of errors can then be identified and programmed into mobile devices (e.g., stored in a database or other data structure on the mobile devices). This can be done for a variety of types of movements. Thus, when these mobile devices are in the field, they can identify a type of movement made by the mobile device, determine the and use the phase shift that produces the fewest amount of errors for the identified type of movement (e.g., $\theta_{STABLE}$ and $\theta_{SWING}$ of FIG. 4), calculate a corresponding boosted vector 530, perform a dot product of the boosted vector 530 and a COG estimate 510, and correct a direction of travel of the COG estimate 510, if necessary. These techniques can substantially increase the accuracy of a COG estimate. For example, using the techniques provided herein, the inventors have increased the accuracy of a COG estimate for a mobile device carried by a user making a jogging motion from an error rate (rate at which the COG estimate indicated an incorrect direction of travel) of over 50% to an error rate of less than 12%.

Figure 6:
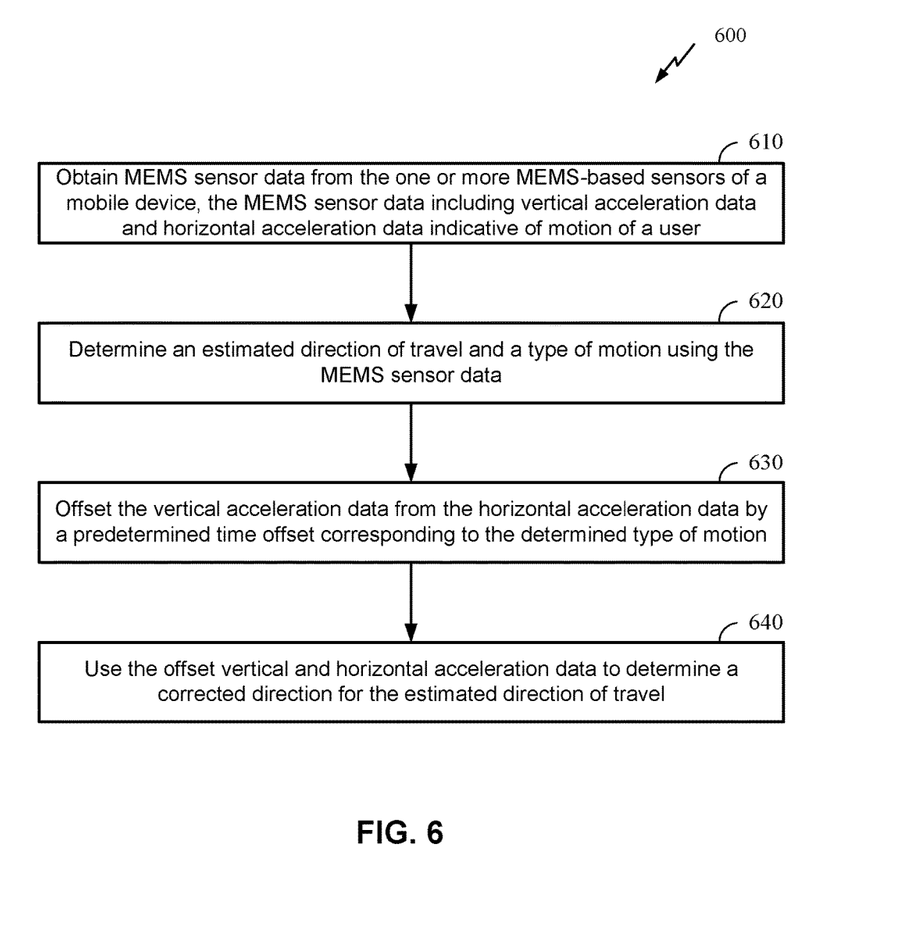
FIG. 6 is a flow diagram of a method 600 of resolving an estimated direction of travel, according to an embodiment.

FIG. 6 is a flow diagram of a method 600 for resolving an estimated direction of travel, according to an embodiment. It can be noted that the functions shown in the blocks illustrated in FIG. 6 can be rearranged or altered in alternative embodiments, depending on desired functionality. Means for performing one or more of the illustrated functions can include hardware and/or software means of a mobile device as illustrated in FIG. 7 and described below.

At block 610, MEMS sensor data is obtained from one or more MEMS-based sensors of a mobile device, where the MEMS sensor data includes vertical acceleration data and horizontal acceleration data indicative of motion of a user. As previously indicated, vertical and horizontal acceleration waveforms (such as those illustrated in FIG. 3) can be extracted from periodic motion made by a user while walking, running, jogging, etc. Here, the MEMS sensor data may be a waveform, raw acceleration measurements, and/or the like. The functionality at block 610 may be triggered by a location or navigation application executed by the mobile device and/or other components of a positioning system, like the positioning system 100 of FIG. 1. Additionally or alternatively, the functionality of block 610 may be triggered by a pedometer detecting steps taken by a user and indicating a potential periodicity of horizontal and/or vertical acceleration. The processing unit may examine the MEMS sensor data acquired while the pedometer is detecting steps of a user to determine whether or not periodicity exists. If so, according to some embodiments, the functionality of block 610 may be triggered.

Figure 7:
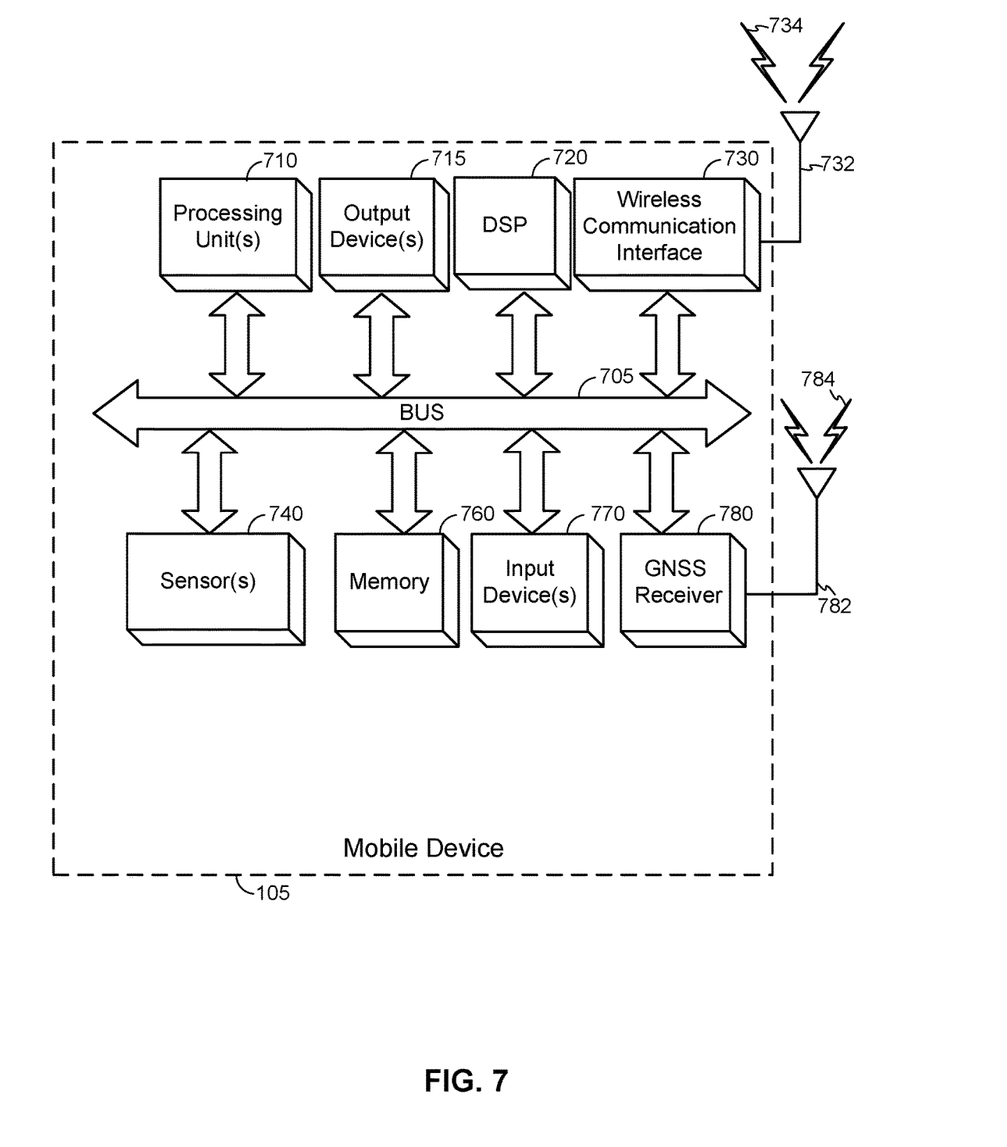
FIG. 7 is a block diagram an embodiment of a mobile device, which can be utilized as described herein above.

According to some embodiments, means for performing the functionality at block 610 can include processing unit(s) 710, output devices 715, wireless communication interface 730, bus 705, sensor(s) 740, and/or memory 760 of the mobile device as shown in FIG. 7 and described herein below.

At block 620, an estimated direction of travel and the type of motion is determined using the MEMS sensor data. As indicated in embodiments described herein, an estimated direction of travel may comprise a determination of a COG vector using the MEMS sensor data (e.g., as shown in FIG. 5). A type of motion may be determined by examining features of the MEMS sensor data to determine whether the motion substantially matches types of motions known to include corresponding features. Different thresholds may exist with respect to identifiable features of the MEMS sensor data to determine whether or not motion of the MEMS sensor data is an "identified type of motion" for purposes of resolving a direction of travel. This, determining a type of motion may be a matter of selecting, based on the MEMS sensor data, the determined type of motion from a plurality of types of motion. The determined type of motion may be the type of motion that most closely matches the motion detected by the MEMS sensor data.

According to some embodiments, means for performing the functionality at block 620 can include processing unit(s) 710, bus 705, and/or memory 760 of the mobile device as shown in FIG. 7 and described herein below.

At block 630, the vertical acceleration data is offset from the horizontal acceleration data by a predetermined time offset corresponding to the determined type of motion. For example, if the determined type of motion is "swing" (e.g., indicating the phone is in the user's swinging hand as a user travels), a corresponding predetermined time offset for "swing" (e.g., $\theta_{SWING}$ of FIG. 3) may be used to offset the vertical acceleration data and the horizontal acceleration data. It can be noted that, although offsetting the vertical acceleration data and the horizontal acceleration data has been described herein as applying a time offset to the vertical acceleration data (thereby enabling boosted horizontal scalars $E_B$ and $N_B$ to be derived from horizontal scalars E and N of the same time), alternative embodiments may potentially offset the vertical and horizontal acceleration data by applying a time offset (e.g., in the reverse direction) to horizontal acceleration data, depending on desired functionality. As stated previously, the horizontal acceleration data may include a plurality of waveforms, or horizontal acceleration data along a plurality of horizontal dimensions (e.g., "north" and "east" axes of a north/east horizontal plane).

According to some embodiments, means for performing the functionality at block 630 can include processing unit(s) 710, bus 705, and/or memory 760 of the mobile device as shown in FIG. 7 and described herein below.

At block 640, the offset vertical and horizontal acceleration data is used to determine a corrected direction for the estimated direction of travel. As indicated in embodiments described herein, this can be done by determining a boosted vector based on the time offset of the vertical acceleration data from the horizontal acceleration data. According to some embodiments, the corrected direction of the estimated direction of travel may be determined by performing a dot product of the boosted vector and a vector representing the estimated direction of travel (e.g., a COG vector). In some embodiments, the boosted vector and a vector representing the estimated direction of travel may be in the ENU reference frame, or another horizontal plane defined relative to the earth's surface. As indicated by equations (1) and (2) above, the boosted vector may be determined by determining horizontal scalars, where each horizontal scalar is the sum of a multiplication of a vertical component of a vector representing the estimated direction of travel and a corresponding horizontal component of the vector representing the estimated direction of travel. The corrected direction for the estimated direction of travel then may be applied by the mobile device for purposes of determining dead reckoning in a location estimate, for example. The corrected direction for the estimated direction of travel may be used in other applications as well.

According to some embodiments, means for performing the functionality at block 640 can include processing unit(s) 710, bus 705, and/or memory 760 of the mobile device as shown in FIG. 7 and described herein below.

FIG. 7 is a block diagram an embodiment of a mobile device 105, which can be utilized as described herein above. For example, the mobile device 105 can be used in the positioning system 100 of FIG. 1, perform some or all of the method 600 of FIG. 6, and/or used as generally described in the embodiments detailed herein. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations.

The mobile device 105 is shown comprising hardware elements that can be electrically coupled via a bus 705 (or may otherwise be in communication, as appropriate). The hardware elements may include a processing unit(s) 710 which may comprise without limitation one or more general-purpose processors, one or more special-purpose processors (such as digital signal processing (DSP) chips, graphics acceleration processors, application specific integrated circuits (ASICs), field-programmable gate arrays (FPGAs)m and/or the like), and/or other processing structure or means, which can be configured to perform one or more of the methods described herein. As shown in FIG. 7, some embodiments may have a separate DSP 720, depending on desired functionality. The mobile device 105 also may comprise one or more input devices 770, which may comprise without limitation one or more touch screens, touch pads, microphones, buttons, dials, switches, and/or the like; and one or more output devices 715, which may comprise without limitation, one or more displays, light emitting diodes (LEDs), speakers, and/or the like.

The mobile device 105 might also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMAX® device, cellular communication circuitry, etc.), and/or the like. The wireless communication interface 730 may permit data (such as location information (dead reckoning information, etc.) and/or location assistance information as described in the embodiments herein) to be communicated with a network, wireless access points, computer systems, and/or any other wireless electronic devices described herein, including the devices illustrated in FIG. 1. The communication can be carried out via one or more wireless communication antenna(s) 732 that send and/or receive wireless signals 734.

Depending on desired functionality, the wireless communication interface 730 may comprise separate transceivers to communicate with base transceiver stations (e.g., antenna 120 of FIG. 1) and other wireless devices and access points. Different data networks may comprise various network types. The wireless communication interface 730 may communicate with a Wireless Wide Area Network (WWAN), which may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 702.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless data network as described herein may comprise a wireless local area network (WLAN) which may be an IEEE 802.11x network, and a wireless personal area network (WPAN) may comprise a Bluetooth® network, an IEEE 802.15x, or some other type of network. The techniques described herein may also be used for any combination of WWAN, WLAN and/or WPAN.

The mobile device 105 can further include sensor(s) 740. Such sensors may comprise one or more MEMS sensors as described herein, including, without limitation, one or more accelerometers, gyroscopes, cameras, magnetometers, altimeters, microphones, proximity sensors, light sensors, and the like. Some or all of the sensor(s) 740 can be utilized as described herein to determine movement, including steps (or strides) of a user. As such, the sensor(s) 740, alone or in conjunction with processing unit(s) 710 and/or other components of the mobile device 105, can be used to implement a pedometer as described herein. Sensor(s) 740 may be used in additional or alternative manners to facilitate a positioning determination by a positioning system (such as positioning system 100 of FIG. 1) by providing measurements for COG as described herein.

Embodiments of the mobile device may also include GNSS receiver 780 capable of receiving signals 784 from one or more GNSS SVs (such as GNSS SVs 110, of FIG. 1) using an GNSS antenna 782. Such positioning can be utilized to complement and/or incorporate the techniques described herein. The GNSS receiver 780 can extract a position of the mobile device, using conventional techniques, from GNSS SVs of a GNSS system, such as Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 780 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS. In other words, GNSS system may comprise any type of Satellite Positioning System (SPS).

The mobile device 105 may further include and/or be in communication with a memory 760. The memory 760 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (e.g., by processing unit(s)) and/or another device of a positioning system. In an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the memory 760 described above. These instructions might take the form of executable code, which is executable by the mobile device 105 and/or might take the form of source and/or installable code, which, upon compilation and/or installation on the mobile device 105 (e.g., using any of a variety of generally available compilers, installation programs, compression/decompression utilities, etc.), then takes the form of executable code.

The techniques described herein may be implemented by various means depending upon applications according to particular features and/or examples. For example, such methodologies may be implemented in hardware, firmware, and/or combinations thereof, along with software. In a hardware implementation, for example, a processing unit (e.g., processing unit(s) 710) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform, such as the memory 760 of the mobile device 105 shown in FIG. 7. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A mobile device comprising:
one or more micro electromechanical system (MEMS)-based sensors configured to provide MEMS sensor data indicative of motion of a user, the MEMS sensor data including vertical acceleration data and horizontal acceleration data; and
a processing unit communicatively coupled with the one or more MEMS-based sensors and configured to:
obtain the MEMS sensor data from the one or more MEMS-based sensors;
use the vertical acceleration data and the horizontal acceleration data of the MEMS sensor data to:
determine an estimated direction of travel, and
match the motion of the user with an identified type of motion;
offset the vertical acceleration data from the horizontal acceleration data by a predetermined phase offset for the identified type of motion; and
use the offset vertical and horizontal acceleration data to determine a corrected direction for the estimated direction of travel.

2. The mobile device of claim 1, wherein the processing unit is further configured to determine a boosted vector based on the offset of the vertical acceleration data from the horizontal acceleration data.

3. The mobile device of claim 2, wherein the processing unit is configured to use the offset vertical and horizontal acceleration data to determine the corrected direction of the estimated direction of travel by performing a dot product of the boosted vector and a vector representing the estimated direction of travel.

4. The mobile device of claim 3, wherein the processing unit is further configured to transform the MEMS sensor data such that the vector representing the estimated direction of travel and the boosted vector are in a horizontal plane defined relative to the earth's surface.

5. The mobile device of claim 2, wherein the processing unit is configured to determine the boosted vector by determining horizontal scalars, where each horizontal scalar is a sum of a multiplication of a vertical component of a vector representing the estimated direction of travel and a corresponding horizontal component of the vector representing the estimated direction of travel.

6. The mobile device of claim 1, wherein the processing unit is configured to determine the type of motion by selecting, based on the MEMS sensor data, the determined type of motion from a plurality of types of motion.

7. A method of providing pedestrian sensor assistance in a mobile device, the method executed by a processing unit and comprising:
obtaining microelectromechanical system (MEMS) sensor data from one or more MEMS-based sensors, the MEMS sensor data including vertical acceleration data and horizontal acceleration data;
using the vertical acceleration data and the horizontal acceleration data of the MEMS sensor data to:
determine an estimated direction of travel, and
match the motion of the user with an identified type of motion;
offsetting the vertical acceleration data from the horizontal acceleration data by a predetermined phase offset for the identified type of motion; and
using the offset vertical and horizontal acceleration data to determine a corrected direction for the estimated direction of travel.

8. The method of claim 7, further comprising determining a boosted vector based on the offset of the vertical acceleration data from the horizontal acceleration data.

9. The method of claim 8, further comprising using the offset vertical and horizontal acceleration data to determine the corrected direction of the estimated direction of travel by performing a dot product of the boosted vector and a vector representing the estimated direction of travel.

10. The method of claim 9, further comprising transforming the MEMS sensor data such that the vector representing the estimated direction of travel and the boosted vector are in a horizontal plane defined relative to the earth's surface.

11. The method of claim 8, further comprising determining the boosted vector by determining horizontal scalars, where each horizontal scalar is a sum of a multiplication of a vertical component of a vector representing the estimated direction of travel and a corresponding horizontal component of the vector representing the estimated direction of travel.

12. The method of claim 7, further comprising determining the type of motion by selecting, based on the MEMS sensor data, the determined type of motion from a plurality of types of motion.

13. An apparatus comprising:
means for obtaining motion data including vertical acceleration data and horizontal acceleration data;
means for using the vertical acceleration data and the horizontal acceleration data of the motion data to:
  determine an estimated direction of travel, and
  match the motion of the user with an identified type of motion;
means for offsetting the vertical acceleration data from the horizontal acceleration data by a predetermined phase offset for the identified type of motion; and
means for using the offset vertical and horizontal acceleration data to determine a corrected direction for the estimated direction of travel.

14. The apparatus of claim 13, further comprising means for determining a boosted vector based on the offset of the vertical acceleration data from the horizontal acceleration data.

15. The apparatus of claim 14, further comprising means for using the offset vertical and horizontal acceleration data to determine the corrected direction of the estimated direction of travel by performing a dot product of the boosted vector and a vector representing the estimated direction of travel.

16. The apparatus of claim 15, further comprising means for transforming the motion data such that the vector representing the estimated direction of travel and the boosted vector are in a horizontal plane defined relative to the earth's surface.

17. The apparatus of claim 14, further comprising means for determining the boosted vector by determining horizontal scalars, where each horizontal scalar is a sum of a multiplication of a vertical component of a vector representing the estimated direction of travel and a corresponding horizontal component of the vector representing the estimated direction of travel.

18. The apparatus of claim 13, further comprising means for determining the type of motion by selecting, based on the motion data, the determined type of motion from a plurality of types of motion.

19. A non-transitory computer-readable medium having instructions embedded thereon for providing pedestrian sensor assistance in a mobile device, the instructions including computer code which, when executed by one or more devices, cause the one or more devices to:
obtain microelectromechanical system (MEMS) sensor data from one or more MEMS-based sensors, the MEMS sensor data including vertical acceleration data and horizontal acceleration data;
use the vertical acceleration data and the horizontal acceleration data of the MEMS sensor data to:
  determine an estimated direction of travel, and
  match the motion of the user with an identified type of motion;
offset the vertical acceleration data from the horizontal acceleration data by a predetermined phase offset for the identified type of motion; and
use the offset vertical and horizontal acceleration data to determine a corrected direction for the estimated direction of travel.

20. The non-transitory computer-readable medium of claim 19, wherein the instructions further comprise computer code for determining a boosted vector based on the offset of the vertical acceleration data from the horizontal acceleration data.

21. The non-transitory computer-readable medium of claim 20, wherein the instructions further comprise computer code for using the offset vertical and horizontal acceleration data to determine the corrected direction of the estimated direction of travel by performing a dot product of the boosted vector and a vector representing the estimated direction of travel.

22. The non-transitory computer-readable medium of claim 21, wherein the instructions further comprise computer code for transforming the MEMS sensor data such that the vector representing the estimated direction of travel and the boosted vector are in a horizontal plane defined relative to the earth's surface.

23. The non-transitory computer-readable medium of claim 20, wherein the instructions further comprise computer code for determining the boosted vector by determining horizontal scalars, where each horizontal scalar is a sum of a multiplication of a vertical component of a vector representing the estimated direction of travel and a corresponding horizontal component of the vector representing the estimated direction of travel.

24. The non-transitory computer-readable medium of claim 19, wherein the instructions further comprise computer code for determining the type of motion by selecting, based on the MEMS sensor data, the determined type of motion from a plurality of types of motion.

* * * * *